United States Patent
Mihály et al.

(10) Patent No.: US 10,805,845 B2
(45) Date of Patent: Oct. 13, 2020

(54) SUPPORTING TRANSPORT PROTOCOL SERVER RELOCATION

(71) Applicant: Telefonaktiebolaget LM Ericsson (publ), Stockholm (SE)

(72) Inventors: Attila Mihály, Dunakeszi (HU); Szilveszter Nádas, Budapest (HU); András Zahemszky, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 39 days.

(21) Appl. No.: 16/319,564

(22) PCT Filed: Aug. 5, 2016

(86) PCT No.: PCT/EP2016/068801
§ 371 (c)(1),
(2) Date: Jan. 22, 2019

(87) PCT Pub. No.: WO2018/024345
PCT Pub. Date: Feb. 8, 2018

(65) Prior Publication Data
US 2020/0037209 A1 Jan. 30, 2020

(51) Int. Cl.
| | | |
|---|---|---|
| H04L 12/28 | (2006.01) | |
| H04W 36/00 | (2009.01) | |
| H04W 36/12 | (2009.01) | |
| H04W 80/06 | (2009.01) | |

(52) U.S. Cl.
CPC ... *H04W 36/0033* (2013.01); *H04W 36/0016* (2013.01); *H04W 36/12* (2013.01); *H04W 80/06* (2013.01)

(58) Field of Classification Search
None
See application file for complete search history.

(56) References Cited

U.S. PATENT DOCUMENTS

| | | |
|---|---|---|
| 7,840,683 B2 | 11/2010 | Zhang |
| 10,291,723 B2 | 5/2019 | Eggert et al. |

(Continued)

FOREIGN PATENT DOCUMENTS

EP 2924956 A1 9/2015

OTHER PUBLICATIONS

Kaplan, H. et al. "A Session Identifier for the Session Initiation Protocol (SIP)", Internet Engineering Task Force (IETF) Request for comments: 7329, Aug. 1, 2014, pp. 1-18, IETF.

(Continued)

*Primary Examiner* — Clemence S Han
(74) *Attorney, Agent, or Firm* — Coats + Bennett, PLLC

(57) ABSTRACT

A system and method for managing a server in a packet data network. A transport protocol session is established between a client (20) and server (14_1) to transfer content from the server to the client in data packets. The transport protocol path is assigned an n-tuple identifier, whereupon the server transmits to the client data packets with the n-tuple identifier. The server additionally transmits declarative information as signaling packets with the n-tuple identifier, wherein the declarative information includes an identifier which is specific to the data being transmitted in the ongoing session. This allows other servers (14_2) to receive the signaling packets and detect the data that is being transmitted. If such another server then determines that it also has the same data and is better placed to serve that data to the client, it can offer to take over the session.

20 Claims, 12 Drawing Sheets

(56) References Cited

U.S. PATENT DOCUMENTS

| | | |
|---|---|---|
| 10,412,159 B1 | 9/2019 | McCullagh |
| 2005/0060553 A1 | 3/2005 | Allen |
| 2005/0267970 A1 | 12/2005 | Sugizaki |
| 2009/0240803 A1 | 9/2009 | Iwakawa |
| 2010/0299552 A1 | 11/2010 | Schlack et al. |
| 2013/0086142 A1 | 4/2013 | Hampel et al. |
| 2013/0114481 A1 | 5/2013 | Kim et al. |
| 2014/0269289 A1 | 9/2014 | Effros et al. |
| 2015/0106420 A1 | 4/2015 | Warfield et al. |
| 2015/0271725 A1* | 9/2015 | Lee ............... H04W 76/12 455/436 |
| 2015/0281367 A1* | 10/2015 | Nygren ........... H04L 65/1066 709/228 |
| 2015/0282219 A1 | 10/2015 | Kweon et al. |
| 2017/0331918 A1 | 11/2017 | Szabo et al. |
| 2017/0339219 A1 | 11/2017 | Le et al. |

OTHER PUBLICATIONS

Schulzrinne H., et al.. "RTP Payload for DTMF Digits, Telephony Tones, and Telephony Signals", Network Working Group, Request for Comments: 4733, Dec. 1, 2006, pp. 1-50, IETF Trust.

Schertz, J. et al., "Understanding Lync Modalities", online blog, Aug. 31, 2014, pp. 1-10, obtained from internet: http://blog.schertz.name/2014/08/understanding-lync-modalities/.

Rosenberg, J. et al., "SIP: Session Initiation Protocol", Network Working Group, Request for Comments: 3261, Jun. 1, 2002, pp. 1-270, The Internet Society.

Ford, A., "TCP Extensions for Multipath Operation with Multiple Addresses", Internet Engineering Task Force (IETF), Request for Comments: 6824, Jan. 1, 2013, pp. 1-64, IETF.

Iyengar, J. et al., "QUIC: A UDP-Based Secure and Reliable Transport for HTTP/2", Network Working Group, Internet-Draft, Jun. 17, 2015, pp. 1-30, IETF.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Technical Specification, 3GPP TS 23.401 V13.6.1, Mar. 1, 2016, pp. 1-365, 3GPP, France.

Anonymous, "Method for In-band Meta-data Transfer", Research Disclosure database No. 623051, Mar. 1, 2016, pp. 1-6, Research Disclosure publication service.

* cited by examiner

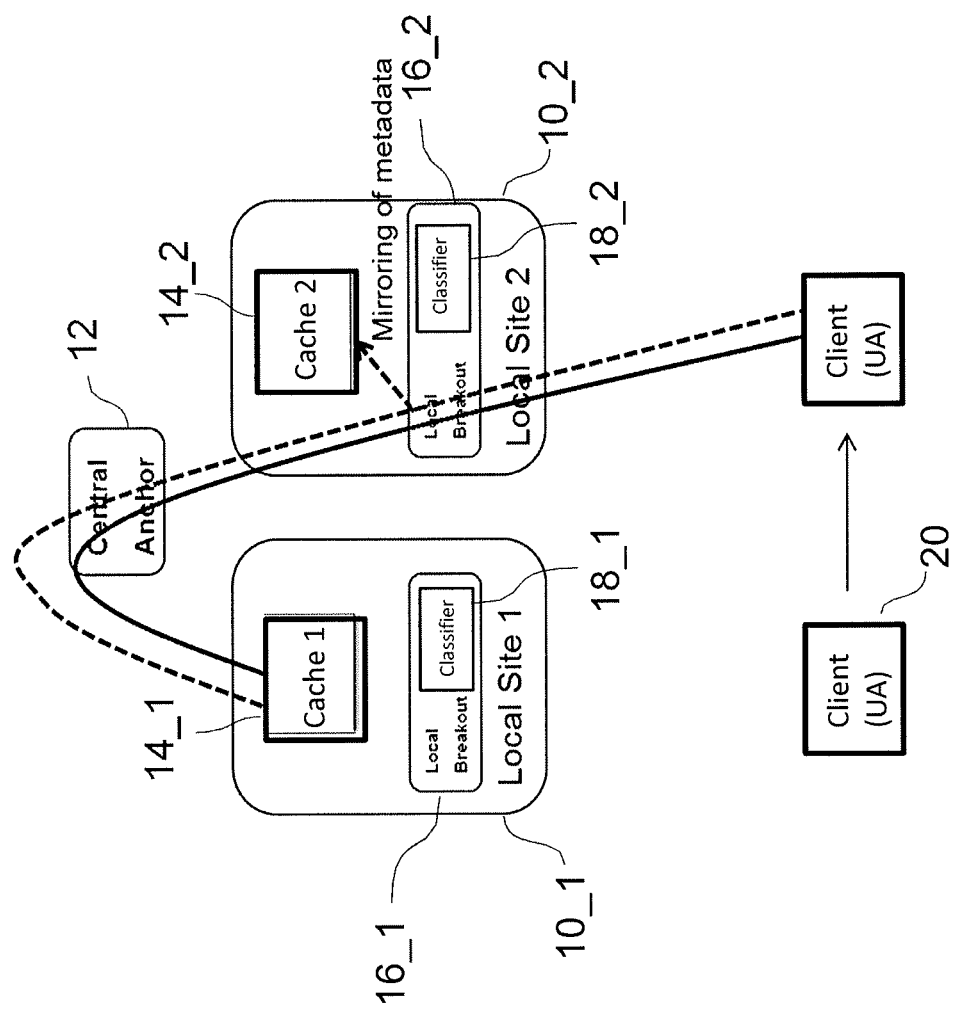

SUPPORTING TRANSPORT PROTOCOL SERVER RELOCATION

TECHNICAL FIELD

The present disclosure relates to server management and in particular to transport protocol server relocation. In some variants, the present disclosure specifically relates to a moving user equipment (UE) which is communicating with a server in a transport protocol environment such as that being standardized in the 3GPP (Third Generation Partnership Project), and how to transfer the UE to a closer server when the UE has moved.

BACKGROUND

Storing of the same content at multiple sites is a known method for speeding up access to the content from a client perspective, and is often referred to as caching or local caching, where the term 'local' implies that the storage is close in network terms to the location of some relevant group of users who may wish to access the content, for example at the same local site as a server which is in transport protocol communication with one or more users who may wish to access the content. In a general packet data network, the network will have logic in its control plane for selecting an appropriate server for the client based on which server is closest having regard to the network topology. Advantages gained by local caching of content include shorter RTT (Round Trip Time) with improved responsiveness, backhaul offload and closer interaction with a mobile radio network.

It should be understood that when we use the term "cache" in this document, we are referring to any scenario in which a server is in communication with a client. In particular, what is of interest are situations in which proximity of the server to the client are important. This therefore includes client-server network relationships which may not be conventionally thought of as local caching, but in which a service would benefit from a server being placed close to a client. For example, if a server is generating a large traffic load, locating the server close to the client would reduce network backhaul. Local placement relative to a client would also benefit servers of object response-time constrained services, for example in split-sensor architectures where a controller is separated from its sensor hardware. Local placement relative to a client would also benefit servers of latency-constrained services, such as industrial controllers.

One way to enable local caching is to distribute the client's IP POP (Internet Protocol Point of Presence), i.e. the anchor, to at least the sites where the caches are located and then to select a cache that is close to the access point to the network. There are techniques enabling anchor distribution for a selected portion of the traffic, such as the SIPTO (Selected IP Traffic Offload) concept defined in 3GPP. SIPTO is 3GPP's standard solution for local anchor re-selection, called SIPTO. SIPTO is described in Section 4.3.15 of 3GPP TS 23.401 version 13.6.1 Release 13 of May 2016. Selection of a closer cache may be done based on geographical information about the access point of the terminal or by using anycast IP addressing and routing to the caches. In either case, the outcome is that the routing of data from the cache will take the optimum path.

Another way to enable local caching is to maintain a central IP POP (i.e. anchor) and to break out the traffic to a local cache by using some traffic classifiers.

FIG. 1 shows a background example of a local caching architecture using distributed anchor points. A UE or client 20 having a UA is in communication with a local cache 14_1 labeled Cache 1. The client 20 is anchored to a distributed anchor point 12_1 labeled Anchor Point 1. Both Cache 1 and Anchor Point 1 are located on a local site 10_1 labeled Local Site 1. There are also other similar local sites which are not being used by the client 20, one of which is shown for the purposes of illustration, namely Local Site 2 having Cache 2 and Anchor Point 2 which have reference numerals 10_2, 14_2 and 12_2 respectively. From a business perspective, the local site may be managed by diverse entities depending on the particular commercial circumstances. Possible operators of the local site are the network provider (e.g. ISP), the server operator, or a third party.

FIG. 2 shows another background example of a local caching architecture using a central anchor point and a local breakout. Local breakout is a mechanism which permits a UE to be connected to a PDN gateway specific to a visited network as well as a home PDN gateway. A UE or client 20 having a UA is in communication with a local cache 14_1 labeled Cache 1. The client 20 is anchored to a central anchor point 12 labeled Central Anchor. Cache 1 is located on a local site 10_1 labeled Local Site 1 which also has a local breakout 16_1. There are also other local sites which are not being used by the client 20, one of which is shown for the purposes of illustration, namely Local Site 2 having Cache 2 and a Local Breakout which have reference numerals 10_2, 14_2 and 16_2 respectively.

It is important to be able to guarantee maintenance of session continuity during user mobility, because, if the connection is broken, the user experience is negatively impacted. There are known methods for achieving session continuity.

In the distributed anchor case of FIG. 1, the session continuity to the original cache may be kept, either by retaining the initially selected anchor, i.e. the IP address of the client remains the same, or by selecting another, closer anchor, i.e. letting the client IP address change, and relying on higher layer protocol features to maintain session continuity. One possibility is to use TP features as these higher layer protocol features. Both MPTCP and the recently proposed QUIC protocol provide features for session continuity towards the same server during nomadic access change. MPTCP is described in "TCP Extensions for Multipath Operation with Multiple Addresses", IETF RFC 6824 https://tools.ietf.org/html/rfc6824. QUIC (Quick User Datagram Protocol (UDP) Internet Connections) which is a TP for HyperText Transfer Protocol 2 (HTTP2) is described in Iyengar & Swett 2015 http://tools.ietf.org/html/draft-tsvwg-quic-protocol-00 "QUIC: A UDP-Based Secure and Reliable Transport for HTTP/2" 17 Jun. 2015.

It is noted that if the background example of FIG. 2 were modified such that the new local site had no local breakout, then intervention from a central entity, such as a central network server having the content, would be needed to maintain session continuity. In this case, the central network server would need to communicate with the currently accessed local cache and take over the current session by obtaining the relevant session states.

FIG. 3 shows a background example of a local caching architecture using a central anchor point and a local breakout similar to FIG. 2, but with additional elements for coordinating change of local cache and local breakout. A UE or client 20 having a UA was in communication with a local cache 14_1 labeled Cache 1, but has recently moved to close to a local cache 14_2 labeled Cache 2. The client 20 is anchored throughout to a central anchor 12 labeled Central Anchor. Cache 1 is located on a local site 10_1 labeled Local Site 1 which also has a local breakout 16_1. Cache 2 is located on a local site 10_2 labeled Local Site 2 which also has a local breakout 16_2. A central network server 14 is provided and has coordination logic to synchronize the states between the 'old' cache 14_1 and the 'new' cache 14_2, so that the new cache 14_2 can take over the ongoing session. It is noted the coordination logic could be hosted elsewhere in the network, not necessarily in a central server. It is additionally noted that, if Local Site 1 did not have a cache, then the client 20 could access the content from the central server. In that case, initially the client would be connected to the central server to access the content, but after relocation to Local Site 2, the client would connect to Local Cache 2 to access the content, i.e. the cache relocation would be from a central cache to a local cache.

FIG. 4A and FIG. 4B show further background examples of a local caching architecture using distributed anchor points similar to FIG. 1, where the same reference numerals are used as in FIG. 1. Specifically, FIG. 4A and FIG. 4B show two related undesirable situations where cache relocation has not been effected efficiently. In both FIG. 4A and FIG. 4B, movement of a UE has resulted in an inefficient data routing path for the current session. The current session is still using local caching, but over a non-optimal path which at least partially negates the advantages of local caching. FIG. 4A shows the situation in which the UE has moved to close to Cache 2, but still communicates with Cache 1 via Anchor Point 1. FIG. 4B shows the same situation, except that the anchor point assigned to the UE has changed to Anchor Point 2, which is located at the "correct" Local Site 2. This effect is called "tromboning" from the kinked shape of the data path.

FIG. 5 shows a further background example of a local caching architecture using a central anchor point and breakouts similar to FIG. 2, where the same reference numerals are used as in FIG. 2. With a central anchor 12, after the UE 20 has moved, there is a risk of a sub-optimal path for the content transfer. This happens when the UE moves to close to a new local site, Local Site 2, where the local breakout function is not configured to recognize the cache's IP address. As a consequence, the traffic has to pass through the central anchor point 12 to reach the "old" cache, Cache 1, on Local Site 1. This is another example of the tromboning effect, since, after UE handover, the traffic between Cache 1 and the UE is routed through Local Site 2 and the central anchor point 12.

Solutions that involve additional network functionality to coordinate session transfer to a closer cache, such as the situation described above with reference to FIG. 3, are of course possible, but they are relatively complex, implying new functionality and APIs (Application Programming Interfaces) on the cache side.

Separate from the above discussion of the background art, there are fundamentally two different IP addressing schemes that can be used for cache relocation. These are anycast IP addressing or addressing in which each cache has a unique IP address. Anycasting is a method used to advertise one IP address from multiple points in a network topology, and, with the help of dynamic routing, to deliver traffic to the nearest point.

If anycast addressing is used, UE mobility causes the client traffic to be redirected to a closer cache, if one exists. The problems with anycasting for cache relocation are the following. If the client-server communication is encrypted, the new cache (i.e. new server) will not be able to decrypt the communication and will reset the connection resulting in loss of session continuity. Moreover, in order to keep session continuity, there is a need for complex state transfer between an "old" cache and a "new" local cache, involving a server that is addressable by all local caches and is continuously updated with information about the on-going transfers including the content being served and the flow 5-tuple. This is because the new cache cannot infer the location of the old cache and the content being transferred in the on-going transfer, since the destination address is the same unicast address, and since all other information is potentially encrypted. Another problem with anycast addressing relevant for both distributed anchor and local breakout implementations is that cache relocation will happen in an uncoordinated way, specifically without taking into consideration factors such as whether the new local cache actually has the content which the user is currently accessing or the available capacity to serve the request adequately.

On the other hand, if the caches each have unique IP addresses, the tromboning effect problem described above in relation to FIG. 4A, FIG. 4B and FIG. 5 arises.

In summary of the background discussion, a better server relocation approach would be one in which, following movement of the UE, the data path is moved to connect to the most appropriate new local site while maintaining session continuity, whether that be via distributed local anchors (FIG. 1), a local breakout in a network with a central anchor (FIG. 2), or a local breakout in a network with a central anchor and central server (FIG. 3). Moreover, an improved solution would involve as little additional network or client functionality as possible.

SUMMARY

There is a need for a server relocation that avoids one or more of the disadvantages of existing approaches discussed above, or other disadvantages.

According to one aspect of the disclosure, there is provided a method for managing a server, comprising: (i) initiating a session by establishing a transport protocol path from the server to a client; (ii) receiving a message from another server offering to take over the session; (iii) deciding on whether to accept the offer based on policy rules, and if 'yes' to send a message to the other server containing state information on the session; and (iv) removing its transport protocol path to the client once the session has been transferred to the other server.

In some embodiments, a local anchor point is provided for a client IP POP to permit a client to be connected to the server. With the server transfer, the local anchor point can then be changed from that associated with the server to that associated with the other server. In other embodiments a local breakout can be provided to permit the client to be connected to the server, optionally in combination with a central anchor point for a client IP POP.

In some embodiments, the server communicates with the client at least partially over an evolved radio access network.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the server and the other server have common content stored thereon and the session involves transmitting common content to the client initially from the server and then from the other server after transfer of the session.

In some embodiments, at least one of the server and the other server is a local cache.

According to one aspect of the disclosure, there is provided a server for a packet data network comprising communication logic operable to: (i) initiate a session by establishing a transport protocol path from the server to a client; (ii) receive a message from another server offering to take over the session; (iii) decide on whether to accept the offer based on policy rules, and if 'yes' to send a message to the other server containing state information on the session; and (iv) remove its transport protocol path to the client once the session has been transferred to the other server.

In some embodiments, the communication logic is operable to connect the server to a client with its IP POP via a local anchor point. In other embodiments, the communication logic is operable to connect the server to a client with its IP POP via a central anchor point. In further embodiments, the communication logic is operable to connect the server to a client via a local breakout.

According to another aspect of the disclosure, there is provided a method for managing a server, comprising: (i) identifying a session between another server and a client; (ii) deciding on whether to offer to take over the session based on policy rules, and if 'yes' to transmit to the other server an offer to take over the session; (iii) on receipt of state information for the session from the other server, establishing a transport protocol path from the server to the client; (iv) continuing the session to the client from the server.

A local breakout may be provided to permit the client to be connected to the server and optionally also a central anchor point for a client IP POP.

In some embodiments, the server communicates with the client at least partially over an evolved radio access network.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the server and the other server have common content stored thereon and the session involves transmitting common content to the client initially from the other server and then from the server after the server has taken over the session.

In some embodiments, at least one of the server and the other server is a local cache.

According to another aspect of the disclosure, there is provided a server for a packet data network comprising communication logic operable to: (i) identify a session between another server and a client; (ii) decide on whether to offer to take over the session based on policy rules, and if 'yes' to transmit to the other server an offer to take over the session; (iii) on receipt of state information for the session from the other server, establish a transport protocol path from the server to the client; (iv) continue the session to the client from the server.

In some embodiments, the communication logic is operable to connect the server to a client with its IP POP via a local anchor point. In other embodiments, the communication logic is operable to connect the server to a client with its IP POP via a central anchor point. In further embodiments, the communication logic is operable to connect the server to a client via a local breakout.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the server has content stored thereon and wherein the communication logic is operable to identify the session running on the other server by virtue of it transfering content that is common to content stored on the server, and wherein the session is continued by the server continuing to transmit the common content to the client after the server has taken over the session.

In some embodiments, the server is a local cache.

According to another aspect of the disclosure, there is provided a method for managing a session transfer between servers, comprising: providing a first server; initiating a session by establishing a transport protocol path between the first server and a client; providing at least a second server; the second server identifying the ongoing session, and consequently transmitting an offer to take over the session; the first server sending state information to the second server relating to the session; the second server establishing a new transport protocol path to the client based on the received state information; and the first server and the second server coordinating transfer of the session to the second server, whereafter the session continues with the second server transmitting to the client.

In some embodiments, the server communicates with the client at least partially over an evolved radio access network.

After the session has been transferred to the second server, the first server can remove its transport protocol path to the client.

In some embodiments, the client has an Internet Protocol Point of Presence, IP POP, and the method may further comprise providing at least first and second local anchor points for the IP POP respectively associated with at least the first server and the second server to permit the client to be connected to at least the first server and the second server respectively. With the change from first server to second server, the local anchor point can be changed from that associated with the first server to that associated with the second server. Alternatively, at least first and second local breakouts can be provided respectively associated with at least the first server and the second server to permit the client to be connected to at least the first server and the second server respectively. The client may have an Internet Protocol Point of Presence, IP POP, and a central anchor point for the IP POP can be provided.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the first server and the second server have common content stored thereon and the session involves transmitting common content to the client initially from the first server and then from the second server after transfer of the session.

In some embodiments, at least one of the first server and the second server is a local cache.

According to another aspect of the disclosure, there is provided a plurality of servers for a packet data network comprising: a first server operable to initiate a session by establishing a transport protocol path between the first server and a client; and a second server operable to identify the ongoing session, and consequently transmit an offer to take over the session. In response to receiving a message from the second server of its willingness to take over the session, the first server can be operable to send information to the second server relating to the session, and the second server can then be operable to establish a new transport protocol path to the client based on the received information, the first and second servers then being operable to coordinate transfer of the session to the second server.

In some embodiments, the first server is operable to connect to a client with its IP POP via a first local anchor point and wherein the second server is operable to connect to a client with its IP POP via a second local anchor point. In some embodiments, the first server is operable to connect to a client with its IP POP via one of a local anchor point and a central anchor point. Moreover, the second server is operable to connect to a client with its IP POP via the other of a local anchor point and a central anchor point. In some embodiments, the first server is operable to connect to a client via a first local breakout and the second server is operable to connect to a client via a second local breakout.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the first server and the second server have common content stored thereon, and are operable to continue transmitting content to the client after the session has been transferred from the first server to the second server.

In some embodiments, at least one of the first server and the second server is a local cache.

According to another aspect of the disclosure, there is provided a computer program product bearing machine readable instructions executable to implement the methods of server relocation recited above. The computer program product may be stored on a computer readable recording medium.

The above-described aspects of the disclosure relate to methods and apparatus for server relocation. The following aspects of the disclosure relate to methods and apparatus for supporting server relocation. It is noted that these two groups of aspects may be combined as desired, or may represent separate independent aspects as recited.

According to another aspect of the disclosure, there is provided a method for managing a server in a packet data network, the method comprising: providing a server; initiating a session by establishing a transport protocol path between the server and a client, wherein the transport protocol path is assigned an n-tuple identifier, whereupon the server transmits to the client data packets with the n-tuple identifier; wherein the server additionally transmits declarative information as signaling packets with the n-tuple identifier, wherein the declarative information includes an identifier for the ongoing session.

In some embodiments, the server has content stored thereon. The data packets may transmit the content. Moreover, the identifier in the declarative information can be used to identify the content being transmitted.

In some embodiments, the server communicates with the client at least partially over an evolved radio access network.

Various different transport protocols can be used. For example, the transport protocol may be a multipath transmission control protocol and the session state information could be a cryptographic hash of a client key. Alternatively, the transport protocol could be a quick user datagram protocol connection protocol and the session state information could be a connection identifier.

At least one of the server and the other server is a local cache.

According to another aspect of the disclosure, there is provided a server in a packet data network comprising communication logic operable to: initiate a session by establishing a transport protocol path between the server and a client, wherein the transport protocol path is assigned an n-tuple identifier; transmit data packets from the server to the client with the n-tuple identifier; transmit declarative information as signaling packets with the n-tuple identifier, wherein the declarative information includes an identifier for the ongoing session.

In some embodiments, the server has content stored thereon, the data packets transmit the content, and wherein the identifier in the declarative information identifies the content being transmitted.

In some embodiments, the server is interoperable with an anchor point or local breakout via which the server can connect to a client with the transport protocol path.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the server is a local cache.

According to another aspect of the disclosure, there is provided a method for managing a server in a packet data network, the method comprising: providing a server; receiving by the server signaling packets from another server relating to a session between the other server and the client, wherein the session uses a transport protocol path which is assigned an n-tuple identifier, and wherein the other server transmits data packets to the client with the n-tuple identifier, wherein the other server additionally transmits the declarative information as the signaling packets with the n-tuple identifier, wherein the declarative information includes an identifier for the ongoing session, and wherein the server identifies the session based on detecting the signaling packets; and deciding on whether to take over the session based on policy rules and if 'yes' transmitting to the other server an offer to take over the session. In some embodiments, the server and the other server have common content stored thereon, which the data packets are transmitting from the other server to the client, and wherein the identifier in the declarative information identifies that the content is being transmitted.

Various different transport protocols can be used. For example, the transport protocol may be a multipath transmission control protocol and the session state information could be a cryptographic hash of a client key. Alternatively, the transport protocol could be a quick user datagram protocol connection protocol and the session state information could be a connection identifier.

In some embodiments, at least one of the server and the other server is a local cache.

In some embodiments, the signaling packets are mirrored to the server from the other server using a classifying function to identify the session.

According to another aspect of the disclosure, there is provided a server in a packet data network, the server being operable to: receive signaling packets from another server relating to a session between another server and a client, wherein the session uses a transport protocol path which is assigned an n-tuple identifier, and wherein the other server transmits to the client data packets with the n-tuple identifier, wherein the other server additionally transmits the declarative information as the signaling packets with the n-tuple identifier, wherein the declarative information includes an identifier for the ongoing session, and wherein the server identifies the session based on detecting the signaling packets; and decide on whether to take over the session based on policy rules and if 'yes' transmitting to the other server an offer to take over the session.

In some embodiments, the server and the other server have common content stored thereon, which the data packets are transmitting from the other server to the client, and wherein the identifier in the declarative information identifies that the content is being transmitted.

In some embodiments, the server is interoperable with an anchor point or local breakout via which the server can connect to a client with the transport protocol path.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, the server is a local cache.

The signaling packets can be mirrored to the server from the other server using a classifying function to identify the session.

According to another aspect of the disclosure, there is provided a method for managing a session transfer between two servers in a packet data network, the method comprising: providing a server; initiating a session by establishing a transport protocol path between the server and a client, wherein the transport protocol path is assigned an n-tuple identifier, whereupon the server transmits to the client data packets with the n-tuple identifier; wherein the server additionally transmits declarative information as signaling packets with the n-tuple identifier, wherein the declarative information includes an identifier for the ongoing session, providing a further server; and mirroring the signaling packets to the further server using a classifying function associated with the further server, wherein the further server analyses the declarative information in the signaling packets to identify the ongoing session, and wherein the further server decides on whether to take over the session based on policy rules and if 'yes' transmits to the server an offer to take over the session. In some embodiments, the server and the further server have common content stored thereon, which the data packets are transmitting from the server to the client, and wherein the identifier in the declarative information identifies that the content is being transmitted.

In some embodiments, the server communicates with the client at least partially over an evolved radio access network.

After the session has been transferred to the second server, the first server can remove its transport protocol path to the client.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

In some embodiments, at least one of the first server and the second server is a local cache.

According to another aspect of the disclosure, there is provided a plurality of servers for a packet data network comprising: a server operable to initiate a session by establishing a transport protocol path between the server and a client, wherein the transport protocol path is assigned an n-tuple identifier, whereupon the server is operable to transmit to the client data packets with the n-tuple identifier, wherein the server additionally is operable to transmit declarative information as signaling packets with the n-tuple identifier, wherein the declarative information includes an identifier for the ongoing session; a further server; a classifier unit associated with the further server operable to mirror the signaling packets to the further server using a classifying function, wherein the further server has logic operable to analyse the declarative information in the signaling packets to identify the ongoing session, and to decide on whether to take over the session based on policy rules and if 'yes' to transmit to the server an offer to take over the session. In response to receiving a message from the second server of its willingness to take over the session, the first server can be operable to send information to the second server relating to the session, and the second server can then be operable to establish a new transport protocol path to the client based on the received information, the first and second servers then being operable to coordinate transfer of the session to the second server. In some embodiments, the server and the further server have common content stored thereon, which the data packets are transmitting from the server to the client, and wherein the identifier in the declarative information identifies that the content is being transmitted.

Various transport protocols could be used. For example, the transport protocol could be a multipath transmission control protocol and the session state information could be a cryptographic hash of a client key. Alternatively, the transport protocol could be a quick user datagram protocol connections protocol and the session state information could be a connection identifier.

At least one of the first server and the second server can be a local cache.

According to another aspect of the disclosure, there is provided a computer program product bearing machine readable instructions executable to implement the methods for supporting server relocation recited above. The computer program product may be stored on a computer readable recording medium.

We now discuss further aspects and features of the invention which may apply both to the group of methods and apparatus that relate to server relocation and the group of methods and apparatus which relate to supporting server relocation.

The snooping server can use logic to analyse the declarative information in the signaling packets to identify the existence of the ongoing session and recognize its ability to take it over. It is worth noting that, although the declarative information is packaged in a packet as if it were intended for the client, it is not intended for the client, but rather intended to be snooped by other servers which also have the content. Using open TCP or encrypted QUIC-based TPs are envisaged realisations for this approach.

One method of configuring signaling packets so that they can be snooped, i.e. identified as signaling packets by other servers, is to manipulate the CRC of the signaling packets when they are created, so that they will fail error checking by a legacy end-to-end protocol. The error check can then be used by the snooping server as a pre-filter for identifying potential signaling packets. The "failed" packets can then be further analysed by the snooping server. A signaling packet can be identified by reading its 'magic number', which identifies the new protocol. Another option would be to XOR the CRC with a pre-determined bit range of the metadata. The signaling packets are thus packaged for transmission in such a way that, if and when they arrive at the client, the client ignores or drops them, whereas any snooping server can identify them.

Before transmitting its willingness to take over the session, the snooping server can use its logic to decide on whether to do so based on snooping server policy rules, and only if 'yes' to transmit to the active server its willingness to take over the session. In addition, before the active server sends information to the snooping server relating to the session, the active server can use logic to decide on whether to do so based on the active server's policy rules, and only if 'yes' to send information to the snooping server relating to the session.

In the following, the active and snooping servers of the first aspect may be referred to as the old and new servers respectively.

It is worth noting that, although the declarative information is packaged in a packet as if it were intended for the client, it is not intended for the client, but rather intended to be snooped by other servers which also have the content. Consequently, the signaling packets are packaged in such a way that, if and when they arrive at the client, the client ignores or drops them.

In some embodiments, one or both of the servers can be local caches of content.

In other embodiments, one of the servers is a central server and the other is a local cache. This situation may arise when the client moves to or from a local site in which there is no cache of the content, so the client needs to connect to a central server to access the content either before or after moving.

It is an inherent feature of the above methods that the content being served by the local caches or central server does not need to be made accessible to other network nodes, so the content in the data path can be encrypted and this does not disturb the cache relocation. In other words, the method is inherently compatible with content encryption.

It is also an inherent feature of the above methods that, after a cache relocation, the previous local site and its cache are no longer relevant. Consequently, during a single content transfer session there can be repeated handovers from one local cache to another, each performed in the same way. Specifically, the previous caches are not involved, only the currently serving cache (i.e. old cache) and the candidate cache (i.e. new cache). The earlier history is not relevant.

The methods can be embodied based on messages requesting cache relocation which, if ignored, have no impact of continuity of service, since the content will continue to be served from the original cache or central server, if no appropriate local cache exists proximal to the UE's new location which is willing to serve the content.

The methods can be embodied such that either or both of the currently active server (i.e. old server) and the candidate server (i.e. new server) can make an informed decision on when to relocate based on their own local factors, such as server load, content availability, segment completion and remaining content fraction to be served to the client. The decisions are made by applying policy rules that can be contained in logic hosted by the server or some other entity associated with the server.

The methods can also be embodied with different mobility management types, specifically with a central anchor point or with distributed anchor points.

If the transport protocol used by the network supports change of IP address, local cache relocation can be achieved in the client application layer.

In certain embodiments, the client is hosted by a user equipment. Moreover, the user equipment may communicate with the servers over an evolved radio access network and/or a fixed line network (e.g. wire or optical cable).

After the session has been transferred to the new server, the old server can remove its transport protocol path to the client, since it is no longer needed.

In some embodiments, the client has an Internet Protocol Point of Presence, IP POP, and there are provided at least first and second local anchor points for the IP POP respectively associated with at least the first server and the second server to permit the client to be connected to at least the first server and the second server respectively. As part of the change of serving content from first server to second server, the local anchor point can be changed from that associated with the first server to that associated with the second server. Alternatively, the local anchor point can remain that associated with the first server, i.e. not be moved.

In other embodiments, at least first and second local breakouts are provided respectively associated with at least the first server and the second server to permit the client to be connected to at least the first server and the second server respectively. Moreover, in these other embodiments, the client has an Internet Protocol Point of Presence, IP POP, and a central anchor point for the IP POP is provided.

According to further aspects of the disclosure, a computer program product bearing machine readable instructions executable to implement the method of the first aspect or the method of the second aspect is provided. The computer program product may be stored on a computer-readable recording medium, such as a CD-ROM, DVD-ROM or semiconductor memory. The computer program product may also be provided in the form of a data signal and/or for download via a network connection.

BRIEF DESCRIPTION OF THE DRAWINGS

The embodiments of the technique presented herein are described herein below with reference to the accompanying drawings.

FIG. 8 shows an embodiment of a local caching architecture using a central anchor point and local breakouts.

DETAILED DESCRIPTION

Figure 1:
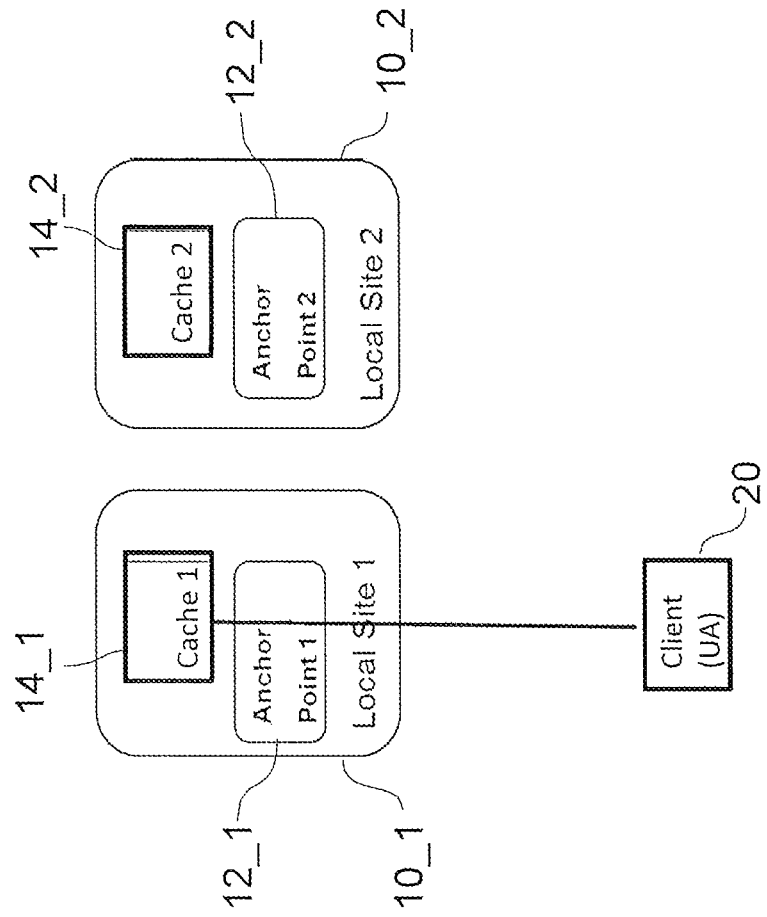
FIG. 1 shows a background example of a local caching architecture using distributed anchor points.
Figure 2:
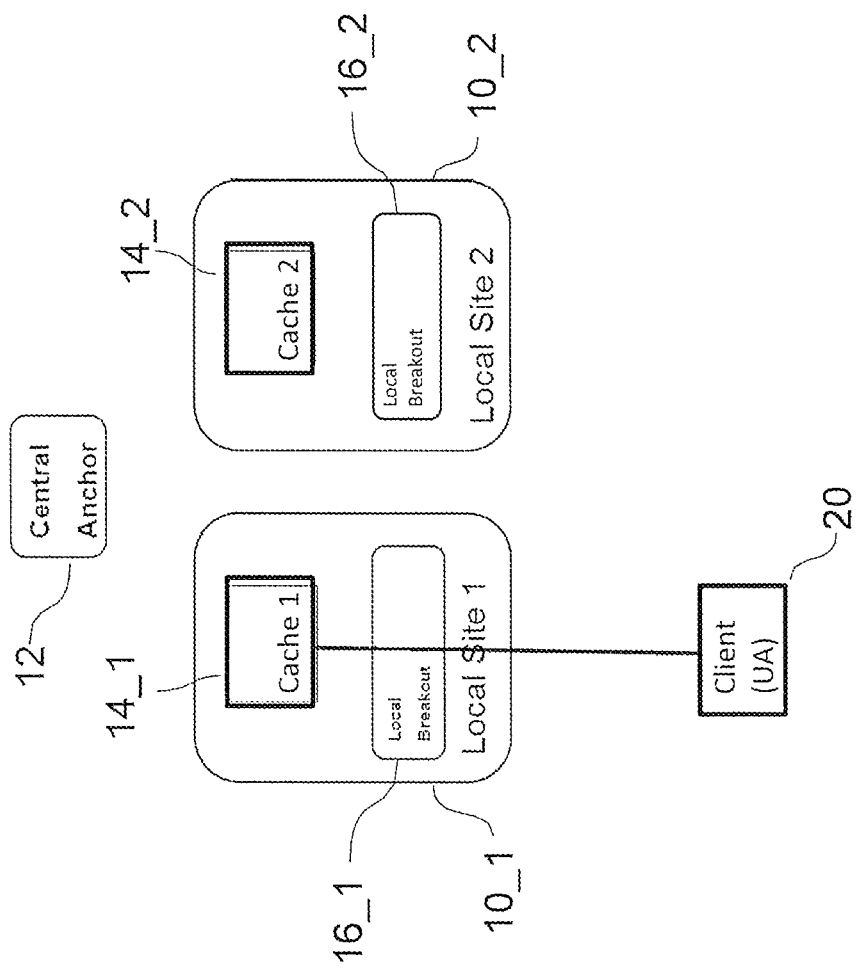
FIG. 2 shows a background example of a local caching architecture using a central anchor point and local breakouts.
Figure 3:
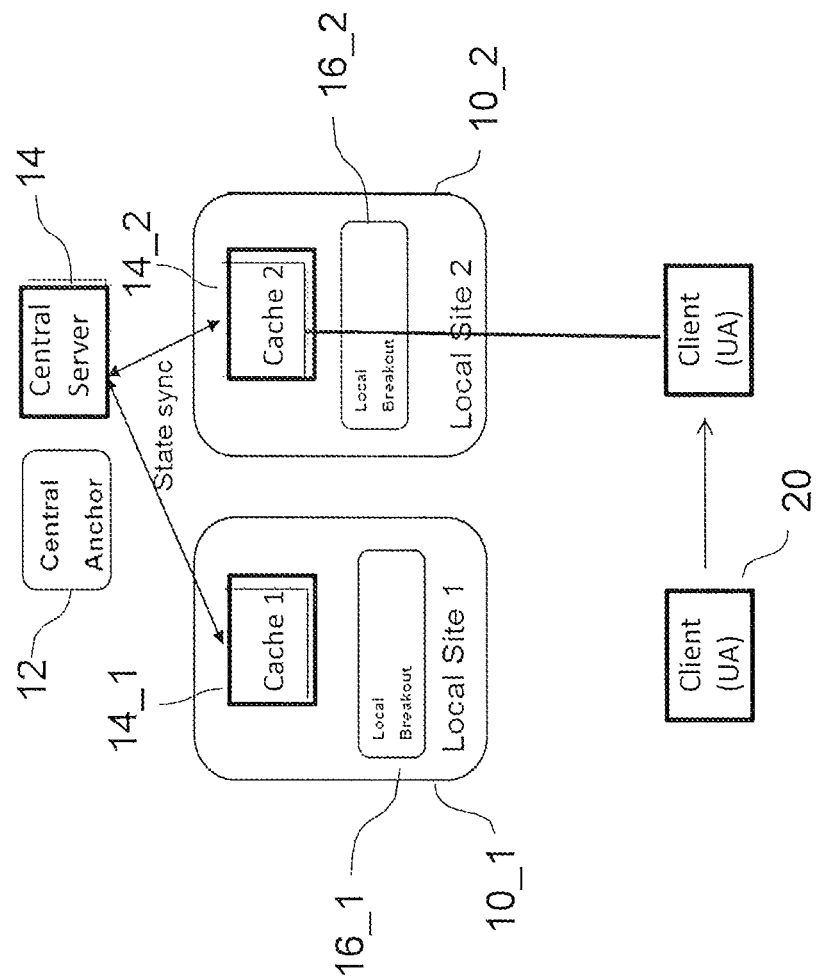
FIG. 3 shows another background example of a local caching architecture using a central anchor point.

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to 5G and also 4G networks, it will be appreciated that the technique presented herein is not limited to any type of cellular network access.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

It is known to a person skilled in the art that a transport protocol such as TCP establishes an end-to-end path (i.e. connection) between two network elements, wherein the TP path typically is bi-directional (i.e. full duplex) and the unit of data transfer typically is a segment. An n-tuple is used to identify a single TP connection by source endpoint information and destination endpoint information and usually also by declaration of the protocol type being used. Specifically, the 5-tuple in a conventional TP such as TCP consists of: 1) Source IP address; 2) Source Port Number; 3) Destination IP address; 4) Destination Port Number; and 5) Protocol type (e.g. TCP, UDP). The source address is the IP address of the network that creates and sends a data packet (i.e. in our example implementations the local cache or central server), and the destination address is the recipient (i.e. in our example implementations typically the client or UE). System and network administrators use 5-tuples to identify key requirements for creating a network connection between two network nodes, typically referred to as a client and a server, which may for example be a user agent (client) and a network entity (server).

Throughout this document where we refer to a UA, UE or client moving closer to another local site, anchor, breakout or cache it is understood that "closer" should not be interpreted literally, but rather in a functional sense to mean that taking account of all prevailing network conditions it is sensible for the UE, UA or client to connect to a different local site, anchor, breakout or cache, or this has been decided by the network, e.g. by logic in its control plane.

Certain terms used in the following detailed description of exemplary embodiments are defined as follows:

4G: is the fourth generation of mobile telecommunications technology as defined by the ITU in IMT Advanced, such as LTE.

5G: is the fifth generation of mobile telecommunications and wireless technology which is not yet fully defined, but in an advanced draft stage, e.g. in 3GPP TS 23.401 version 13.6.1 Release 13 of May 2016.

SIP: is the protocol used for messaging defined in the IETF's RFC 3261 "SIP: Session Initiation Protocol"

UA: is part of a UE and acts as a client in a TP for communication with a server.

UE: is a terminal that resides with the user which hosts a UA.

The description uses a number of acronyms, the meaning of which are as follows:

| Acronym | Description |
| --- | --- |
| 3GPP | Third Generation Partnership Project |
| CID | Connection Identifier |
| CRC | Cyclic Redundancy Check |
| GPRS | General Packet Radio Service |
| GTP | GPRS Tunneling Protocol |
| IP | Internet Protocol |
| LTE | Long-term evolution |
| MPTCP | Multipath TCP |
| POP | Point of Presence |
| PDN | Packet Data Network |
| PDU | Packet Data Unit |
| QUIC | Quick UDP Connections |
| RAN | Evolved Radio Access Network |
| RTT | Round Trip Time |
| SIP | Session Initiation Protocol |
| SIPTO | Selected IP Traffic Offload |
| TCP | Transmission Control Protocol |
| TP | Transport Protocol |
| UA | User Agent |
| UDP | User Datagram Protocol |
| UE | User Equipment |

Figure 6:
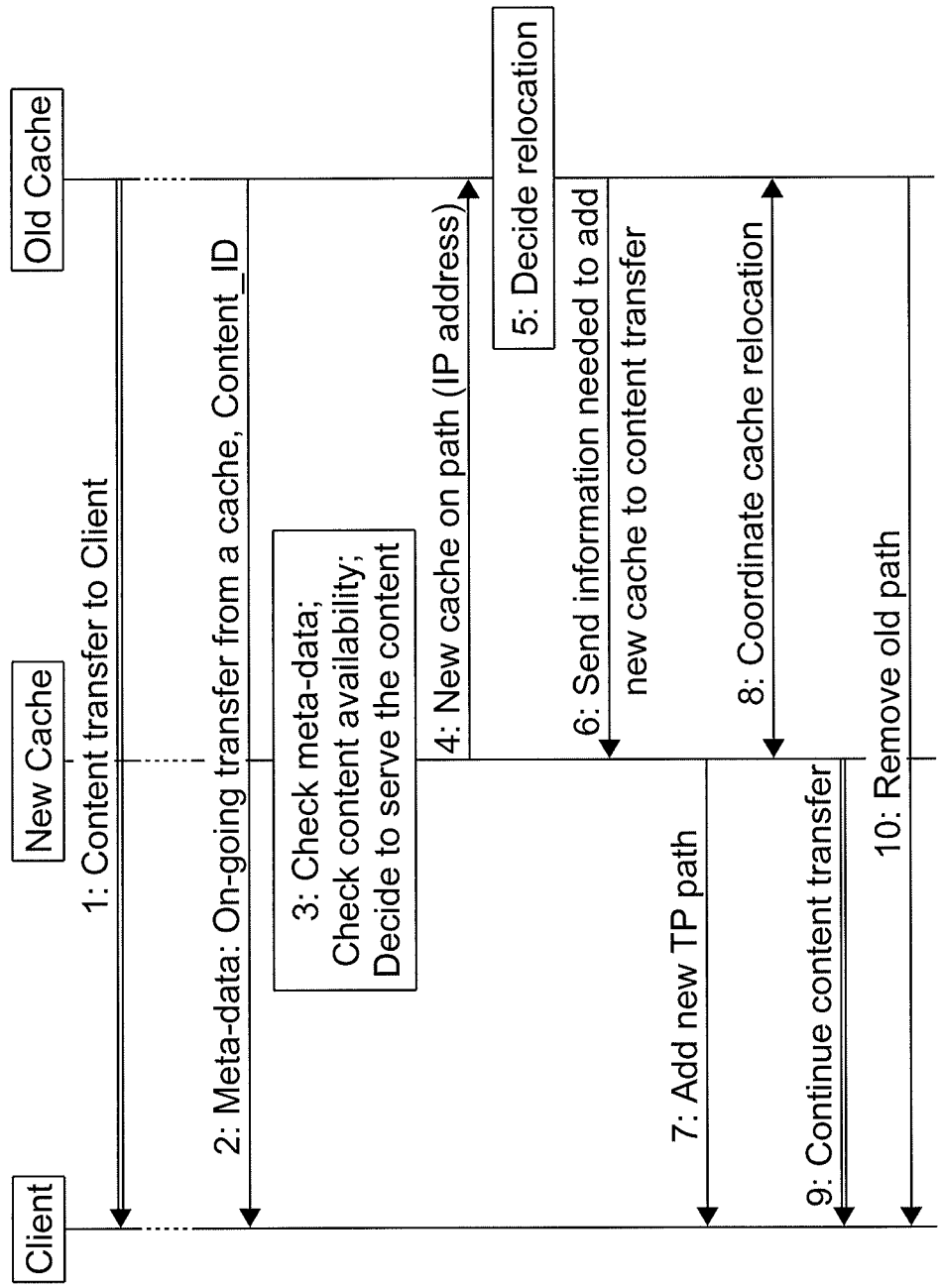
FIG. 6 is a message sequence diagram illustrating in detail the method for cache relocation according to an embodiment of the invention.

FIG. 6 is a message sequence diagram illustrating in detail a method embodiment for cache relocation for a client (i.e. UA of a UE) from an old cache to a new cache.

Step 1 shows the on-going content transfer from the old cache to the client.

Step 2 shows that the old cache is periodically sending declarative information. The declarative information includes information about the on-going transfer, particularly the Content_ID. The role of Content_ID is to unambiguously identify the content for a potential cache lying in the path in such a way that other third party nodes on the path cannot identify it. One solution is to provide Content_ID as a cryptographic hash of the content. In this way only the entities that have the content may identify the content, i.e., only the relevant local caches and the central server whence the content originates. The declarative information is not intended for the client, and so is not sent as part of the end-to-end encrypted communication. The declarative information is sent on-path by using the 5-tuple of the content transfer. The declarative information message is prepared in such a way that it will be ignored or dropped if received by the client. More details on how to achieve such an on-path metadata transfer for different TPs may be found in the article "Method for In-band Meta-data Transfer" published digitally on 18 Feb. 2016, and in the March 2016 paper journal, in Research Disclosure, Questel Ireland Limited, ISSN 0374-4353 as database number 623051, the contents of which are incorporated herein by reference in their entirety.

Step 3 involves the new cache reading the metadata information, which was sent by the old cache. (It is noted that the method can also be implemented in cases where there are multiple caches intercepting the metadata between the old cache and the client). After reading the metadata, the new cache uses logic to check whether the content identified by Content_ID is present in its local storage (i.e. local cache). If it has the content, it does not automatically decide to transmit its willingness to take over the session to the old cache. Rather, it makes a decision on whether it wants to offer to take over the session by using inbuilt logic to apply policy rules which may be part of the server with the local cache or some other part of the local site. The decision can be conditional on various factors. For example, the candidate new cache can take into account its own load, so that if its load is too high, it might decide not to serve the content to the particular client. After a positive decision to offer to become the new cache, the candidate new cache informs the old (i.e. existing) cache of its willingness to serve the remaining content to the client. It does this by sending a "New cache on path" message to the old cache, including its IP address. The new cache may infer the TP from the frame structure of the received packet (e.g. MPTCP or QUIC). Of course, if the candidate new cache decides not to serve the content, e.g. because it does not have the content or it has too high a load, it does not send a message.

Step 5 is a decision step in which the old cache decides whether to accept the relocation to the new cache in response to receiving the "New cache on path" message from the would-be new cache. The existing (i.e. old) cache can decide to accept or deny the transfer, i.e. also this decision can be either positive or negative. This decision is made by applying policy rules contained in logic which can be hosted by the server with the old cache or by some other part of the associated local site. The timing of the decision is also the old cache's responsibility, e.g. it can wait until transfer of the current chunk of content is finished. A negative decision might follow from, for example, a situation where there is not much more content to transfer, or a situation in which the state transfer is deemed to be difficult.

In Step 6, following a positive decision, the new cache is informed by the old cache. The old cache then send the new cache the information it needs to add itself to the content transfer. One example is based on multipath TCP and is described in more detail below.

In Step 7, making use of the TP features for multi-access, a new TP path is added between the new cache and the client, whereupon the client has a TP path both to the new cache and the old cache.

In Step 8, the relocation is coordinated between the old cache and the new cache. This could, for example, include sending different byte offsets, e.g. which byte was last sent from the new cache to the old cache and which byte is the last acknowledged by the client. Further details are given below in relation to multipath TCP and QUIC examples.

In Step 9, after receiving the required information, the new cache continues transferring the content to the client. Thus, the content is transferred on a shorter path than previously.

Finally, at Step 10, the old cache removes the old path from the TP connection by sending a message to the client. The content transfer then continues from the new cache, without the client application having been involved in the change of cache.

Example Relocation Based on Multipath TCP:

As one example, MPTCP can be used as the TP between the caches and the client. MPTCP is a standardized multi-path extension of TCP that defines sub-flows to transfer data over different paths (available through e.g., different access types). MPTCP allows multiple IP addresses to be used simultaneously by the communication parties. When using MPTCP as a transport protocol, Step 6 above is realized by sending the cryptographic hash of the receiver's (i.e. the client's) key, as exchanged in the initial MP_CAPABLE handshake. At Step 7, the new cache sends a SYN packet (i.e. with the SYN bit set) with the MP_JOIN option, indicating that the new TP path belongs to the original MPTCP connection with the old cache. Step 8 includes transmitting ACKs received by the old cache to the new cache. Removing the old path at Step 10 includes sending an MPTCP segment with the FIN (finish) bit set. In MPTCP, this indicates that the subflow is to be closed by the endpoint.

Example Relocation Based on QUIC:

QUIC is a recent industry proposal for a reliable, UDP-based TP for HTTP2 transfers with embedded security. The session state in QUIC is defined by the security state and not by the IP/port and protocol number 5-tuple. Therefore, mobility between different accesses with IP address change is simple to handle in QUIC, by sending an identification of the session/security state, named CID. Multi-path for QUIC is under development, but because of the above QUIC characteristics, multi-path with different IP addresses will be easy to achieve. Therefore, QUIC is seen as a TP that will be suitable for supporting the method disclosed herein in the future. Some additional parameters, e.g., security states would be required to transfer between the old and new cache, i.e., in Step 6.

Network support considerations for the proposed mechanism of cache relocation are now discussed. The proposed mechanism involves the metadata being conveyed from the serving cache, i.e. the old cache, to the cache closer to the user, i.e. the new cache. This requires network support. This is straightforward when the business actor operating the local cache is the network operator. Otherwise, the cache provider needs to have some kind of business agreement with the network operator. Based on this agreement, the network operator may configure its network "middleboxes" to mirror relevant metadata, such as the signaling packets from Step 2 in FIG. 6, to the caches in the local cloud. Mirroring means that the packets carrying signaling information are duplicated, i.e., they are also conveyed to the client; in this way, they may also contain payload information to the client. Note that if mirroring is used, then this is not a typical middlebox action, because the original traffic may pass untouched to the endpoint, since the signaling information is conveyed in such a way that it is discarded by the client if received.

The signaling packets from Step 2 in FIG. 6 can be identified through a specific bit pattern (so-called magic number). A magic number is a distinct unique value that is statistically unlikely to be mistaken for any other number. In the context of the present application that means a magic number is a bit pattern with a value that is sufficiently large to make it highly unlikely that the same bit pattern could exist for some other reason in the corresponding part of the end-to-end data packet. The purpose of the magic number is to allow a very fast way, i.e. a method that is easily implementable in hardware, to decide that packets that do not include the magic number are not signaling packets.

The placement of the network operator middleboxes depends on the network solution that is provided for local cache selection, e.g. distributed anchor point or local breakout. Here it is noted that the anchor point and the classifier function are two different logical functionalities, so need to be considered independently.

Some further embodiments are now described.

Figure 7A:
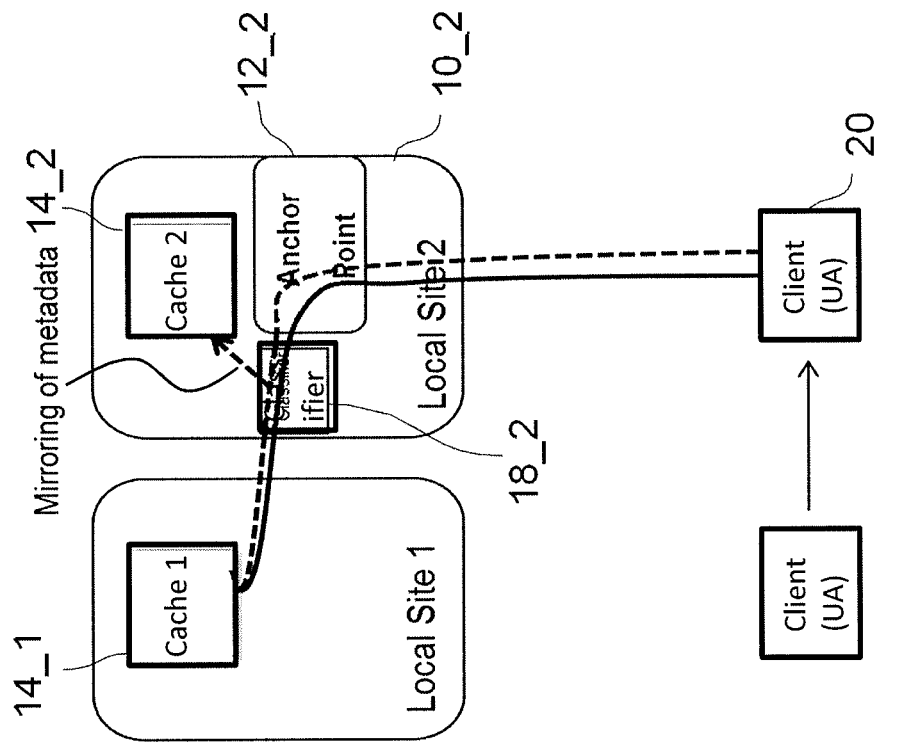
FIG. 7A shows an embodiment of a local caching architecture using distributed anchor points.
Figure 7B:
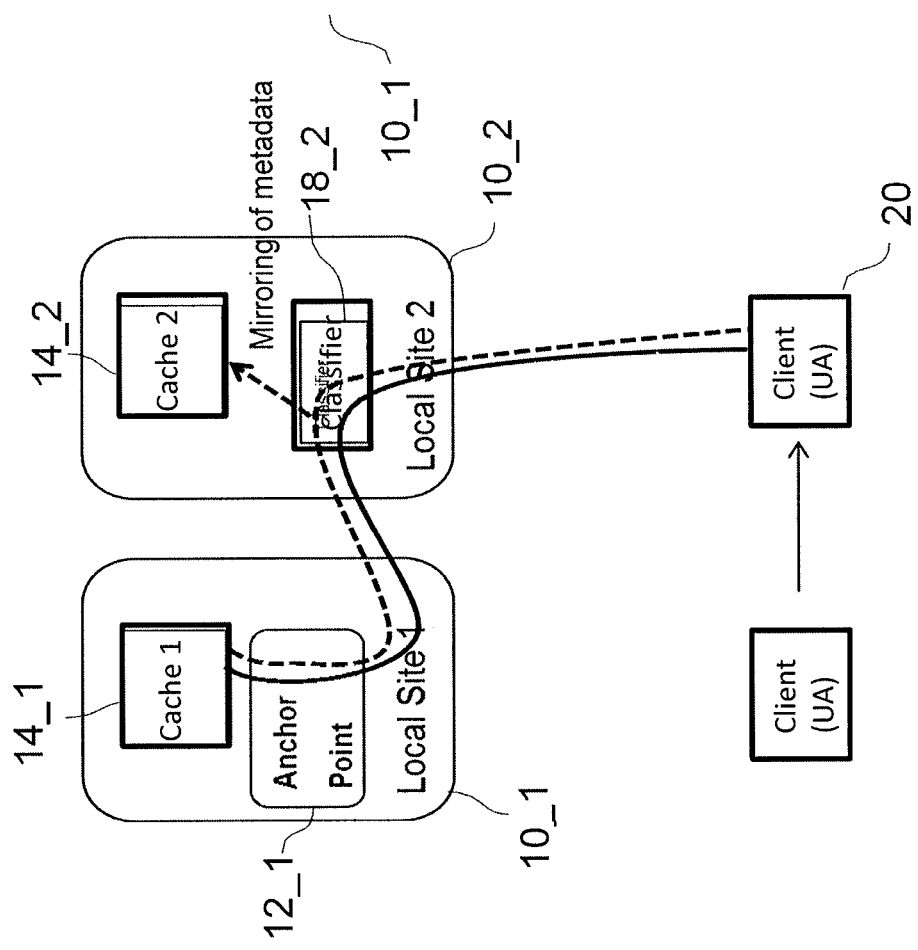
FIG. 7B shows another embodiment of a local caching architecture using distributed anchor points.

FIG. 7A and FIG. 7B show two different distributed anchor point variants embodying the invention. It is noted that only the traversed logical elements are shown. In both variants, the distributed anchor points on the local sites implement the middlebox functionality for the network.

Figure 4A:
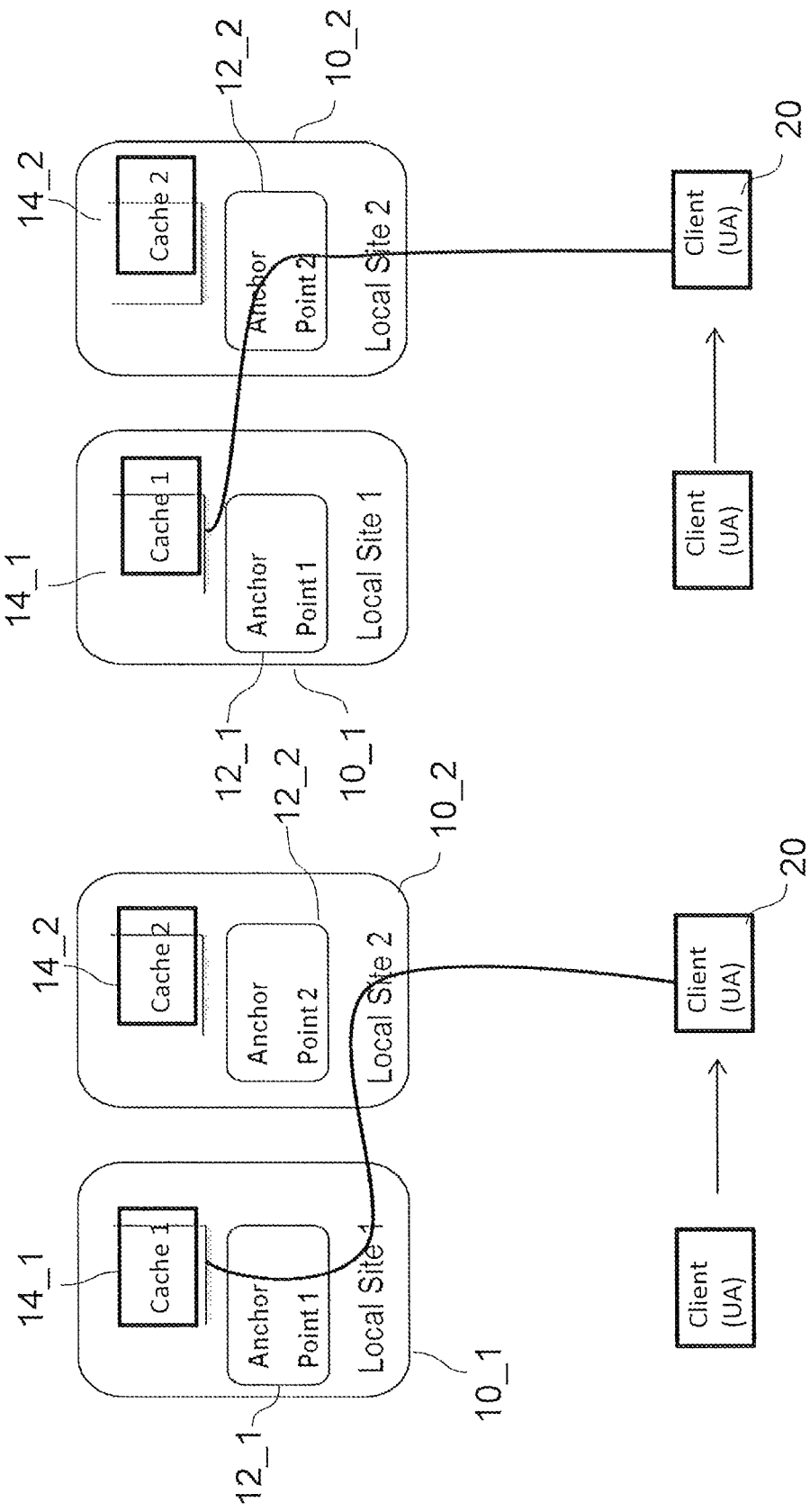
FIG. 4A shows a further background example of a local caching architecture using distributed anchor points similar to FIG. 1.

FIG. 7A shows an embodiment which can be compared with the background example of FIG. 4A. The path of data packets is shown with a solid line, and the path of signaling packets with a dashed line. The starting situation is that a UE or client 20 having a UA is in communication with a local cache 14_1 labeled Cache 1. The client 20 is anchored to a distributed anchor point 12_1 labeled Anchor Point 1. Both Cache 1 and Anchor Point 1 are located on a local site 10_1 labeled Local Site 1. There are also other similar local sites, one of which is shown, namely Local Site 2 10_2. Local Site 2 has Cache 2 14_2, Anchor Point 2 (not shown since not traversed) and a classifier unit, Classifier 2 18_2. It is noted Local Site 1 also has a classifier, Classifier 1, but this is not shown, since it is not traversed. What is depicted is the moment in time after the client 20 has moved to proximal Local Site 2, wherein at this moment in time the metadata contained in the signaling packets is being mirrored by Classifier 2 to Cache 2 in preparation for switching to use Cache 2, i.e. in preparation for re-routing the data path to Cache 2 and ceasing to use Cache 1 for the data path. Local Site 2 includes a classifier functionality unit, Classifier 2, which is operable to mirror packets containing metadata (i.e. signaling packets) to the cache on its local site, e.g. if the magic number is seen. In this variant, the anchor point is not changed even though there is going to be a change of local cache.

Figure 4B:
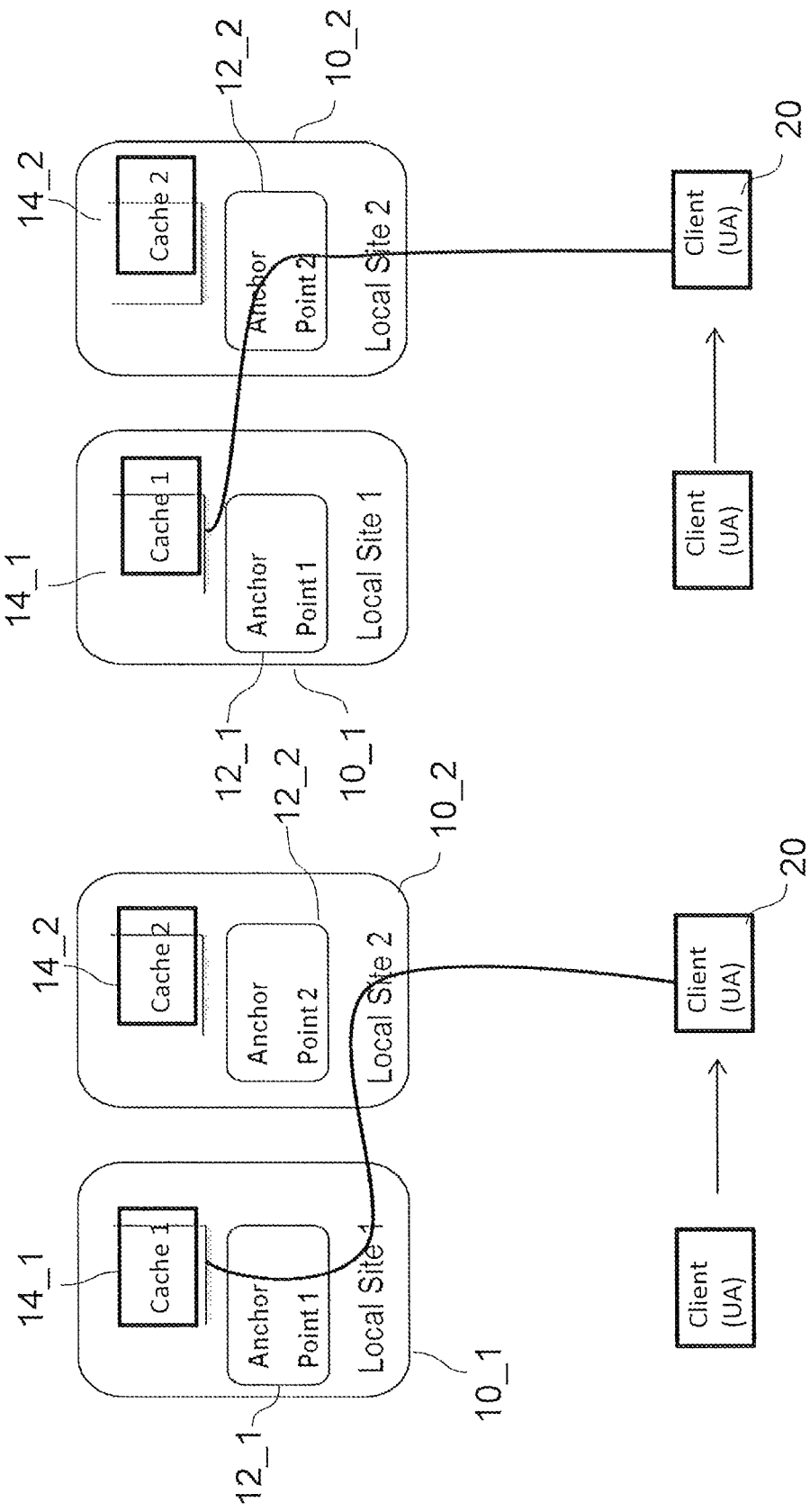
FIG. 4B shows a further background example of a local caching architecture using distributed anchor points similar to FIG. 1.

FIG. 7B shows an embodiment which can be compared with the background example of FIG. 4B. The path of data packets is shown with a solid line, and the path of signaling packets with a dashed line. The starting situation is that a UE or client 20 having a UA is in communication with a local cache 14_1 labeled Cache 1, and that the client 20 is anchored to a distributed anchor point (not shown, but the same as FIG. 7A). Both Cache 1 and Anchor Point 1 are located on a local site 10_1 labeled Local Site 1. There are also other similar local sites, one of which is shown, namely Local Site 2 10_2. Local Site 2 has Cache 2 14_2, Anchor Point 2 (not shown since not traversed) and a classifier unit, Classifier 2 18_2. It is noted Local Site 1 also has a classifier, Classifier 1, but this is not shown, since it is not traversed. What is depicted is the moment in time after the client 20 has moved to proximal Local Site 2, wherein at this moment in time the metadata contained in the signaling packets is being mirrored by Classifier 2 to Cache 2 in preparation for switching to use Cache 2, i.e. in preparation for re-routing the data path to Cache 2 and ceasing to use Cache 1 for the data path. In this variant, the anchor point has already been changed to Anchor Point 2 as a result of the movement of the client 20 to proximal to Local Site 2. Local Site 2 includes a classifier functionality unit, Classifier 2, which is operable to mirror packets containing metadata (i.e. signaling packets) to the cache on its local site, e.g. if the magic number is seen. In this variant, the anchor point is thus changed as well as the change of local cache as a result of the client movement.

Figure 5:
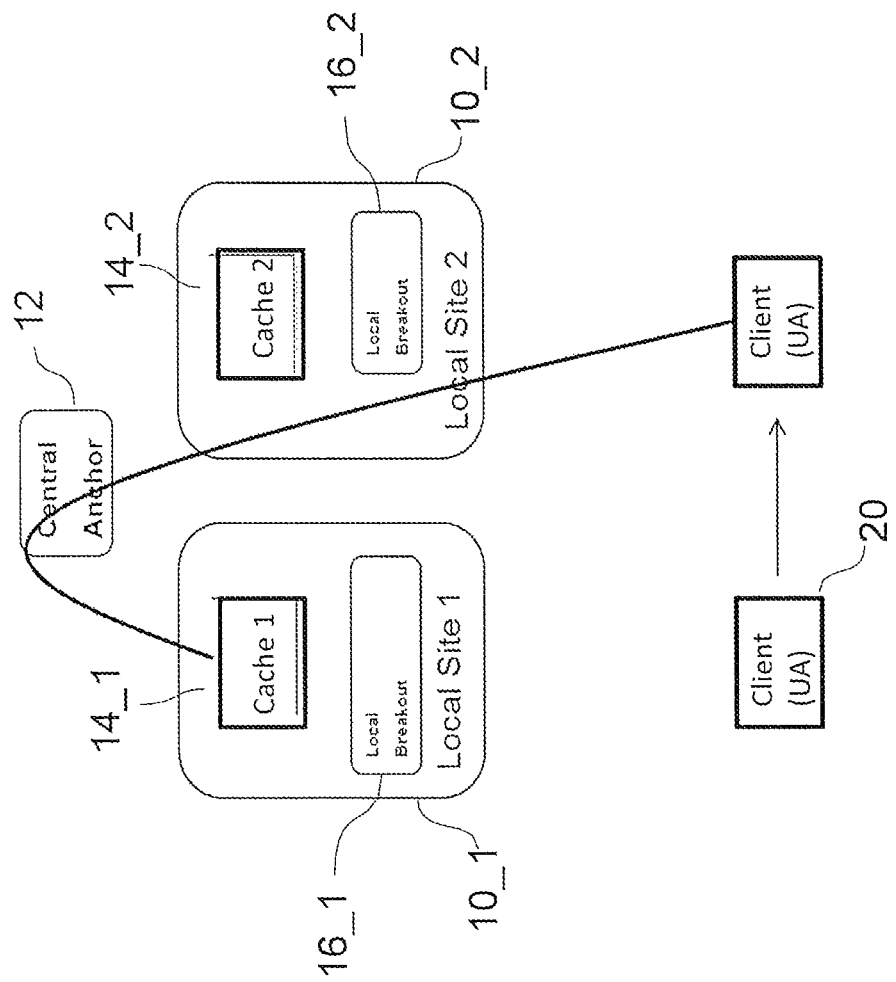
FIG. 5 shows a further background example of a local caching architecture using a central anchor point and local breakouts similar to FIG. 2.

FIG. 8 shows a central anchor and local breakout variant embodying the invention comparable with the background example of FIG. 5. Local breakout is a mechanism which permits a UE to be connected to a PDN gateway specific to a visited network as well as a home PDN gateway. The path of data packets is shown with a solid line, and the path of signaling packets with a dashed line. The starting situation is that a UE or client 20 having a UA is in communication with a local cache 14_1 labeled Cache 1. The client 20 is anchored to a central anchor point 12 labeled Central Anchor. Cache 1 is located on a local site 10_1 labeled Local Site 1 which also has a local breakout, Local Breakout 1, 16_1. Local Breakout 1 incorporates a classifier 18_1, Classifier 1, having a classifier functionality. There are also other local sites including the illustrated Local Site 2 having Cache 2 and Local Breakout 2 which have reference numerals 10_2, 14_2 and 16_2 respectively. Local Breakout 2 incorporates a classifier 18_2, Classifier 2, having a classifier functionality. What is depicted is the moment in time after the client 20 has moved to proximal Local Site 2, wherein at this moment in time the metadata contained in the signaling packets is being mirrored by Classifier 2 of Breakout 2 to Cache 2 in preparation for switching to use Cache 2, i.e. in preparation for re-routing the data path to Cache 2 and ceasing to use Cache 1 for the data path. The local breakout unit with local breakout functionality thus incorporates a classifier unit with classifying functionality that copies, i.e. mirrors, packets containing metadata to the caches, if the magic number is seen. The placement of the network operator middleboxes depends on the network solution that is provided for local cache selection. In many cases, the breakout function will be performed by the radio base station. However, in the case that the local breakout function is performed by IP filters to break out from GTP tunnels, it may be that the nodes, i.e. network entities, that perform the local breakout function also perform the breakout function. It is noted that in this case the routers on the local sites should also be configured to route these packets to the breakout function, if not secured otherwise.

Figure 9:
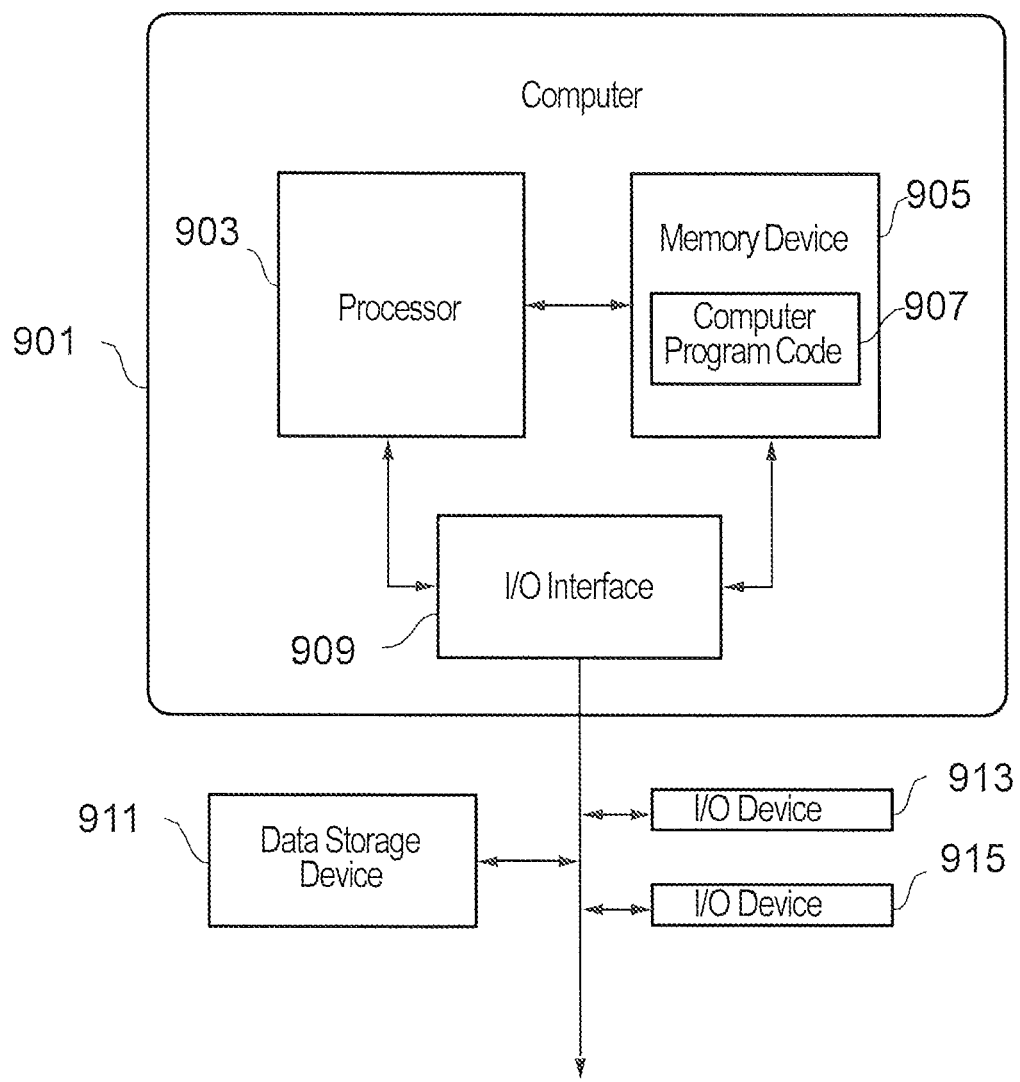
FIG. 9 shows a structure of a computer and computer program code that may be used to implement any of the disclosed methods and may be incorporated in any of the disclosed components.

FIG. 9 shows a structure of a computer and computer program code that may be used to implement any of the above-described methods and may be incorporated in any of the above-described components. Specifically, such a computer as shown may be incorporated in or configured to implement any of the following: local sites, local breakouts, local caches, central server, anchor points (central or local), clients, and classifiers.

Computer system 901 comprises a processor 903 coupled through one or more I/O Interfaces 909 to one or more hardware data storage devices 911 and one or more I/O devices 913 and 915. Processor 903 may also be connected to one or more memory devices or memories 905. At least one memory device 905 contains stored computer program code 907, which is a computer program that comprises computer-executable instructions. The stored computer program code includes a program that implements the method and method aspects presented herein. The data storage devices 911 may store the computer program code 907. Computer program code 907 stored in the storage devices 911 is configured to be executed by processor 903 via the memory devices 905. Processor 903 executes the stored computer program code 907.

Memory 905 may comprise any known computer-readable storage medium, which is described below. In one implementation, cache memory elements of memory 905 provide temporary storage of at least some program code (e.g., program code 907) in order to reduce the number of times code needs to be retrieved from bulk storage while instructions of the program code are carried out. Moreover, similar to CPU 903, memory 905 may reside at a single physical location, comprising one or more types of data storage, or be distributed across a plurality of physical systems in various forms.

I/O interface 909 comprises any system for exchanging information to or from an external source. I/O devices 913, 915 comprise any known type of external device, including a display device (e.g., monitor), keyboard, etc. A bus provides a communication link between each of the components in computer system 901, and may comprise any type of transmission link, including electrical, optical, wireless, etc.

I/O interface 909 also allows computer system 901 to store information (e.g., data or program instructions such as program code 907) on and retrieve the information from computer data storage unit 911 or another computer data storage unit (not shown). Computer data storage unit 911 may comprise any known computer-readable storage medium. For example, computer data storage unit 911 may be a non-volatile data storage device, such as a semiconductor memory, a magnetic disk drive (i.e., hard disk drive) or an optical disc drive (e.g., a CD-ROM drive which receives a CD-ROM disk).

An implementation of the present disclosure may take the form of a computer program product embodied in one or more computer-readable storage medium(s) (e.g., memory 905 and/or computer data storage unit 911) having computer-readable program code (e.g., program code 907) embodied or stored thereon.

Program code (e.g., program code 907) embodied on a computer-readable medium may be transmitted using any appropriate medium, including but not limited to wireless, wireline, optical fiber cable, radio frequency (RF), etc., or any suitable combination of the foregoing.

Figure 10:
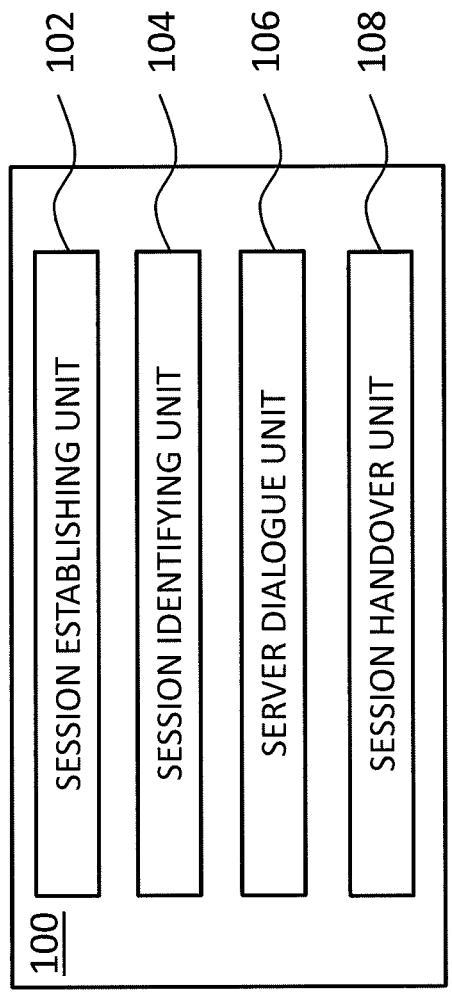
FIG. 10 is a block diagram showing a cache relocation unit present in the packet data network of FIG. 7A, 7B or 8.

FIG. 10 is a block diagram showing a cache relocation unit 100 present in the packet data network of FIG. 7A, 7B or 8. The cache relocation unit 100 comprises a session establishing unit 102 operable to initiate a session by establishing a transport protocol path between a client and a server, so that the server can transmit content cached on the server to the client. The cache relocation unit 100 further comprises a session identifying unit 104 operable to identify any other sessions which are not being served by the server, to check if the server could volunteer to take over any of these session. If the session establishing unit 102 is currently fully occupied serving content, then the session identifying unit 104 may be disabled. The cache relocation unit 100 further comprises a server dialogue unit 106 operable to manage messaging relating to handover of sessions between the server and other servers. The different types of message include: volunteering to take over a session; messaging to decline or accept a volunteering message. Specifically, after a server has identified a session which it could take over, it may transmit its willingness to the serving server to take over the session. The cache relocation unit 100 further comprises a session handover unit 108 operable to transfer information such as state data to enable session hand over after hand over has been agreed between two servers and also to establish a new transport protocol path to the client based on the received information. The session handover unit 108 is operable to coordinate the transfer of the session to the new server, whereafter the session continues with the new server transmitting content to the client.

Figure 11:
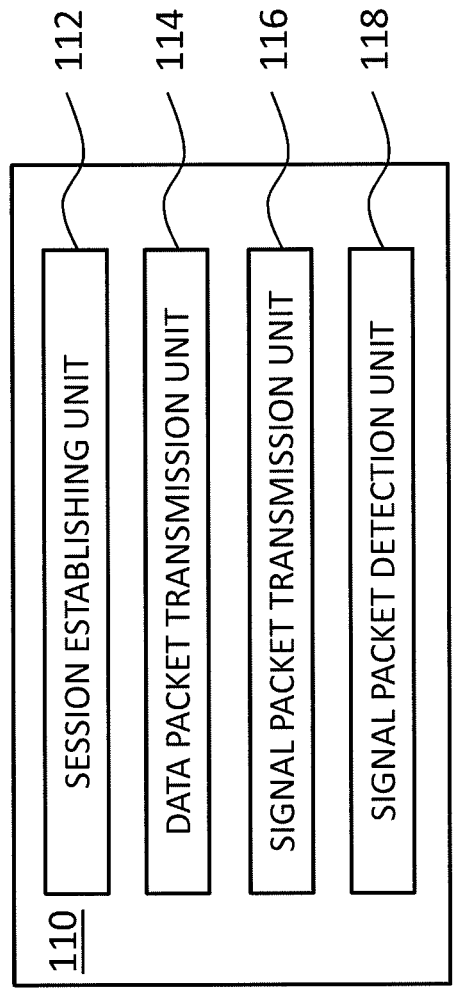
FIG. 11 is a block diagram showing a unit for supporting cache relocation in a local site of the packet data network of FIG. 7A, 7B or 8.

FIG. 11 is a block diagram showing a unit 110 for supporting cache relocation in a local site of the packet data network of FIG. 7A, 7B or 8. The cache relocation support unit 110 comprises a session establishing unit 112 operable to initiate a session by establishing a transport protocol path between a client and a server, so that the server can transmit content cached on the server to the client. The transport protocol path is assigned an n-tuple identifier, such as a 5-tuple identifier. The cache relocation support unit 110 further comprises a data packet transmission unit 114 operable to transmit content to the client as data packets with the n-tuple identifier. The cache relocation support unit 110 further comprises a signal packet transmission unit 116 which is operable to transmit declarative information as signaling packets with the n-tuple identifier, wherein the declarative information includes an identifier of the content being transmitted in the ongoing session. The cache relocation support unit 110 further comprises a signal packet detection unit 118 which is operable to analyse declarative information in signaling packets from sessions which are not serving content from a server hosted at its local site in order to identify other sessions which are not being served by the server, to check if the server could volunteer to take over any of these sessions.

Figure 12:
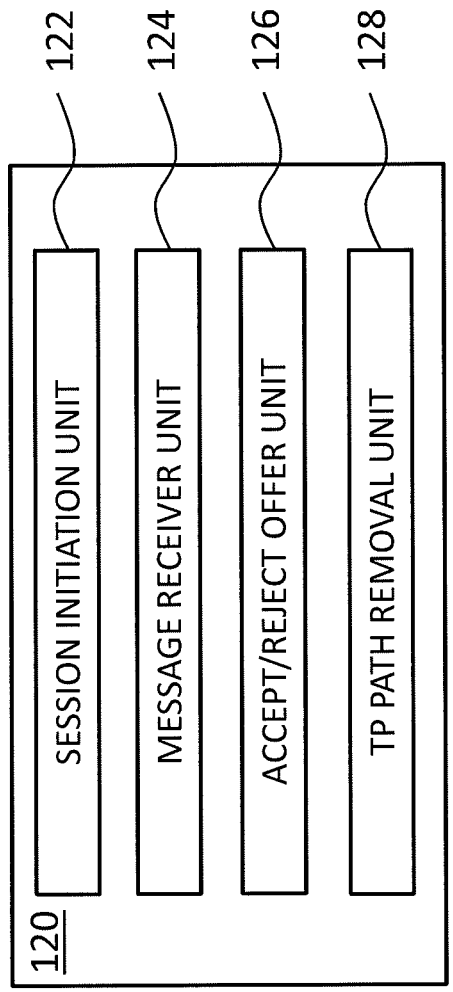
FIG. 12 is a block diagram showing a first server conducting a user session present in the packet data network of FIG. 7A, 7B or 8.

FIG. 12 is a block diagram showing a first server 120 operable to conduct a user session present in the packet data network of FIG. 7A, 7B or 8. The first server 120 comprises a session initiation unit 122 operable to initiate a session by establishing a transport protocol path from the server to a client. The first server 120 further comprises a message receiver unit 124 operable to receive a message from another server offering to take over the session. The first server 120 further comprises an accept/reject offer unit 126 operable to decide on whether to accept the offer based on policy rules, and if 'yes' to send a message to the other server containing state information on the session. The first server 120 further comprises a TP path removal unit 128 operable to remove its transport protocol path to the client once the session has been transferred to the other server.

Figure 13:
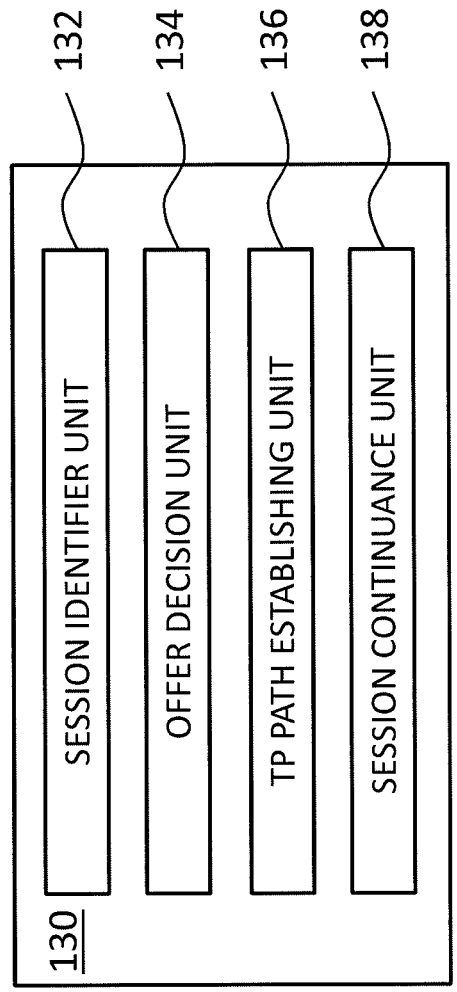
FIG. 13 is a block diagram showing a second server taking over a user session present in the packet data network of FIG. 7A, 7B or 8.

FIG. 13 is a block diagram showing a second server 130 operable to take over a user session present in the packet data network of FIG. 7A, 7B or 8. The second server 130 comprises a session identifier unit 132 operable to identify a session between another server and a client. The second server 130 further comprises an offer decision unit 134 operable to decide on whether to offer to take over the session based on policy rules, and if 'yes' to transmit to the other server an offer to take over the session. The second server 130 further comprises a TP path establishing unit 136 operable, on receipt of state information for the session from the other server, to establish a transport protocol path from the server to the client. The second server 130 further comprises a session continuance unit 138 operable to continue the session to the client from the server.

Figure 14:
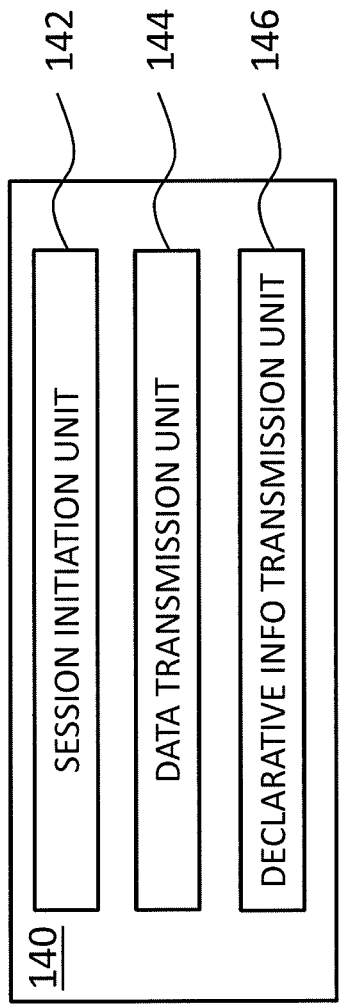
FIG. 14 is a block diagram showing a first server for supporting server relocation present in the packet data network of FIG. 7A, 7B or 8.

FIG. 14 is a block diagram showing a first server 140 for supporting server relocation present in the packet data network of FIG. 7A, 7B or 8. The first server 140 comprises a session initiation unit 142 operable to initiate a session by establishing a transport protocol path between the server and a client. The first server 140 further comprises a data transmission unit 144 operable to transmit content from the server to the client as data packets. The first server 140 further comprises a declarative information transmission unit 146 operable to transmit declarative information as signaling packets with an n-tuple identifier, wherein the declarative information includes an identifier of the content being transmitted in the ongoing session.

Figure 15:
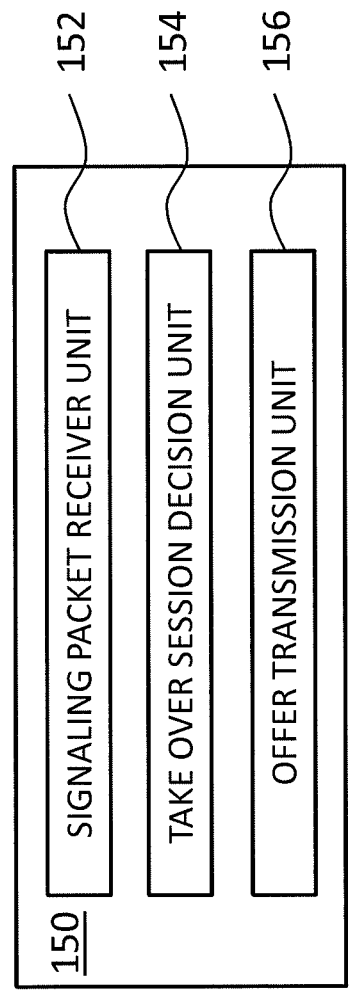
FIG. 15 is a block diagram showing a second server supporting server relocation present in the packet data network of FIG. 7A, 7B or 8.

FIG. 15 is a block diagram showing a second server 150 for supporting server relocation present in the packet data network of FIG. 7A, 7B or 8. The second server 150 comprises a signaling packet receiver unit 152 operable to receive signaling packets mirrored from another server using a classifying function to identify a session between another server and a client which is serving content that is stored in the second server's stored content. The session uses a transport protocol path. The other server transmits the content to the client as data packets. The other server additionally transmits the declarative information as the signaling packets with an n-tuple identifier, wherein the declarative information includes an identifier of the content being transmitted in the ongoing session. The second server identifies the session based on detecting the signaling packets. The second server 150 further comprises a take-over session decision unit 154 operable to decide on whether to take over the session based on policy rules. The second server 150 further comprises an offer transmission unit 156, which following a decision to offer to take over the session from the other server, is operable to transmit to the other server an offer to take over the session.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A method for managing a server in a packet data network, the method comprising:
providing a server;
receiving, by the server, signaling packets from another server relating to a session between the another server and a client, wherein the session uses a transport protocol path which is assigned an n-tuple identifier, and wherein the another server transmits data packets to the client with the n-tuple identifier, wherein the another server additionally transmits declarative information as the signaling packets with the n-tuple identifier, wherein the declarative information includes an identifier for the ongoing session, and wherein the server identifies the session based on detecting the signaling packets; and
deciding on whether to take over the session based on policy rules, and if 'yes', transmitting, to the other server, an offer to take over the session.

2. The method of claim 1, wherein:
the server and the other server have common content stored thereon, which the data packets are transmitting from the another server to the client; and
the identifier in the declarative information identifies that the content is being transmitted.

3. The method of claim 1, wherein:
the transport protocol is multipath transmission control protocol; and
session state information is a cryptographic hash of a client key.

4. The method of claim 1, wherein:
the transport protocol is quick user datagram protocol connections; and
session state information is a connection identifier.

5. The method of claim 1, wherein at least one of the server and the another server is a local cache.

6. The method of claim 1, wherein the signaling packets are mirrored to the server from the another server using a classifying function to identify the session.

7. A server in a packet data network, the server comprising:
processing circuitry;
memory containing instructions executable by the processing circuitry whereby the server is operative to:
receive signaling packets from another server relating to a session between another server and a client, wherein the session uses a transport protocol path which is assigned an n-tuple identifier, and wherein the another server transmits to the client data packets with the n-tuple identifier, wherein the another server additionally transmits declarative information as the signaling packets with the n-tuple identifier, wherein the declarative information includes an identifier for the ongoing session, and wherein the server identifies the session based on detecting the signaling packets; and
decide on whether to take over the session based on policy rules, and if 'yes', transmit, to the another server, an offer to take over the session.

8. The server of claim 7, wherein:
the server and the another server have common content stored thereon, which the data packets are transmitting from the another server to the client; and
wherein the identifier in the declarative information identifies that the content is being transmitted.

9. The server of claim 7, wherein the server is interoperable with an anchor point or local breakout via which the server can connect to the client with the transport protocol path.

10. The method of claim 7, wherein:
the transport protocol is multipath transmission control protocol; and
session state information is a cryptographic hash of a client key.

11. The method of claim 7, wherein:
the transport protocol is quick user datagram protocol connections; and
session state information is a connection identifier.

12. The server of claim 7, wherein the server is a local cache.

13. The server of claim 7, wherein the signaling packets are mirrored to the server from the other server using a classifying function to identify the session.

14. A method for managing a session transfer between two servers in a packet data network, the method comprising:

providing a server;
initiating a session by establishing a transport protocol path between the server and a client, wherein the transport protocol path is assigned an n-tuple identifier;
thereafter, the server transmitting:
   data packets with the n-tuple identifier to the client;
   declarative information as signaling packets with the n-tuple identifier, wherein the declarative information includes an identifier for the ongoing session;
providing a further server;
mirroring the signaling packets to the further server using a classifying function associated with the further server;
the further server analyzing the declarative information to identify the ongoing session;
the further server deciding on whether to take over the session based on policy rules, and if 'yes', transmitting, to the server, an offer to take over the session.

15. The method of claim 14, wherein:
the server and the further server have common content stored thereon, which the data packets are transmitting from the server to the client; and
the identifier in the declarative information identifies that the content is being transmitted.

16. The method of claim 14, wherein the server and the further server communicate with the client at least partially over an evolved radio access network.

17. The method of claim 14, further comprising, after the session has been transferred to the further server, the server removing its transport protocol path to the client.

18. The method of claim 14, wherein:
the transport protocol is multipath transmission control protocol; and
session state information is a cryptographic hash of a client key.

19. The method of claim 14, wherein:
the transport protocol is quick user datagram protocol connections; and
session state information is a connection identifier.

20. The method of claim 14, wherein the server and/or the further server is a local cache.

* * * * *